(12) United States Patent
Maruyama (10) Patent No.: US 6,333,487 B1
(45) Date of Patent: Dec. 25, 2001

(54) TORCH-ANGLE SETTING DEVICE (75) Inventor: Yoichi Maruyama, Chiba-ken (JP)

(73) Assignee: Koike Sanso Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/537,260

(22) Filed: Mar. 29, 2000

(30) Foreign Application Priority Data

Nov. 5, 1999 (JP) .................................................. 11-314787

(51) Int. Cl.[7] .................................................. B23K 26/02
(52) U.S. Cl. ........................... 219/121.78; 901/21; 901/25
(58) Field of Search ........................ 219/121.18, 121.39, 219/121.67, 121.78, 68; 266/62, 63, 77; 74/490.01, 490.04; 901/21, 25

(56) References Cited

U.S. PATENT DOCUMENTS

| | | | |
|---|---|---|---|
| 3,619,550 | * 11/1971 | Matthews | 219/121.6 |
| 4,205,828 | * 6/1980 | Hooper et al. | 266/77 |
| 4,694,139 | * 9/1987 | Roder | 219/121.78 |
| 4,825,036 | * 4/1989 | Bickel et al. | 219/121.78 |
| 5,064,340 | * 11/1991 | Genov et al. | 414/744.5 |
| 5,222,409 | * 6/1993 | Dalakian | 74/479.01 |
| 5,374,804 | * 12/1994 | Uchino et al. | 219/121.78 |
| 5,778,730 | * 7/1998 | Soloman et al. | 74/490.04 |
| 6,201,207 | * 3/2001 | Maruyama et al. | 219/121.39 |

FOREIGN PATENT DOCUMENTS

401228693A * 9/1989 (JP) .................................. 219/121.78

* cited by examiner

Primary Examiner—Samuel M. Heinrich
(74) Attorney, Agent, or Firm—Townsend & Banta

(57) ABSTRACT

An turning shaft 1 which turns a torch with keeping it on a normal line to the turning shaft is connected with an end of an first rotation shaft 2 which is arranged at a right angle to the turning shaft 1. A second rotation shaft 3 is connected with the first rotation shaft 2. Both the rotation shafts are connected with each other through a first arm 4, and a second arm is connected with with the rotation shaft 3. a first fixed gear 14 is fixed to the first rotation shaft 2, and a second fixed gear 15 is fixed to the second arm 5. a middle gear 16 is arranged between both the fixed gears, and a rotation axis 16c is fixed to the first arm 4. a motor 17 is mounted above the upper bent portion 4a and a gear 17a is engaged with the first fixed gear 14. While rotating the first arm by angle θ in the direction of arrow a, the second arm 5 is rotated by angle 2θ in the direction of arrow b, wherein the angle made between the extension of line of the turning shaft and the extension of line of the second arm 5 is θ.

7 Claims, 7 Drawing Sheets

TORCH-ANGLE SETTING DEVICE

BACKGROUND OF THE INVENTION

1. Field of the invention

The present invention relates to a torch-angle setting device which is advantageously used together with a cutting device for carrying out the groove-angle Cutting of material being cut by gas cutting torch, plasma cutting torch or laser cutting torch.

2. Description of the Prior Art

In a field such as shipbuilding, bridge construction or building, there are many cases where a plurality of steel plates, each having a given size, are welded to each other in order to form a construction. When steel plates are welded to each other, the thicker the thickness of steel plates becomes, the more difficult it is to expect weld penetration uniform in the direction of thickness. Therefore, the groove angle is generally formed.

In particular, there are parts having an outer periphery formed of curved line in special parts used in shipbuilding, or bridge construction. In this case, it is needed to cut material being cut into a design having the periphery formed of a curved line, and, at the same time, to carry out groove-angle cutting. Further, even in other parts, there are cases where groove angle is needed to be prepared on a design having a curved or straight periphery.

The structure of a cutter for the groove-angle cutting of material being cut is explained hereinafter. When cutting material such as steel plates, a gas cutting torch, plasma cutting torch, or a laser cutting torch is selectively used in a general way. When a groove-angle cutting is carried out, a torch is inclined at the cutting angle, and this cutting angle is maintained until the objective groove-angle cutting is finished. Therefore, when material being cut is cut with a groove angle in a curved line, a torch-angle setting device is formed in such a manner that a torch can be turned so that the direction of the torch coincides with the curved line.

Further, a position as a standard of control in the case where cutting is made, is the intersection of the extension of line of a torch and material being cut, wherein a locus of the intersection coincides with an objective design. Accordingly, it is not a problem of utmost importance whether the intersection of the extension of the line of a torch and material being cut coincides with the intersection of the extension of the line of a turning shaft and material being cut, as a reference when turning the torch. Therefore, when a torch in which the two intersections do not coincide with each other, an offset system machining head is formed, and as a torch in which the two intersections coincide with each other, a zero offset system machining head is formed, and programs corresponding to the respective machining heads are provided.

As mechanisms for setting torch-angle, various mechanisms have been provided. However, when using a gas cutting torch or plasma cutting torch, the mechanism for setting the torch-angle is generally formed in such a manner that a torch can be set at a desired angle by mounting a torch holder for holding a torch on a carriage which moves along a fan-shaped guide, and moving the carriage by means of a motor. In this mechanism, the turning of a torch is carried out by turning the fan-shaped guide, wherein a zero offset system machining head can be realized by keeping the fan-shaped guide away from the turning shaft, and by aligning the torch with the turning shaft.

Further, in the case of a laser cutting torch, the torch is provided with a mechanism for inclining the torch at an objective inclined angle, and with a mechanism for aligning straight-passing laser beam with an inclined angle of the torch while reflecting the laser beam.

In case of using a laser cutting torch as a torch and setting the torch-angle thereby, there has been a problem when forming a zero offset system machining head, the structure thereof is complicated and large-scaled, because the mechanism for a reflecting laser beam is needed. Therefore, an offset system machining head has been generally formed. However, in this case, there is a problem in that the machining head lacks smoothness when turning a torch along a curved line in the objective design, so that a notch (groove, concave) is formed in a cut surface.

BRIEF SUMMARY OF THE INVENTION

Accordingly, it is an object of the present invention to provide a torch-angle setting device which is applied mainly for a cutting machine using a laser cutting torch and which facilitates smoothly making the groove-angle cutting. In order to solve the problem of the present invention, a torch-angle setting device according to the present invention comprises a turning shaft which is arranged perpendicular to material being cut, a first rotation shaft which is arranged at a right angle to the turning shaft and which has an end connected to the turning shaft, a second rotation shaft which is arranged parallel with the first rotation shaft, a first arm which is connected to the first rotation shaft and to the second rotation shaft, a second arm which has an end connected to the second rotation shaft, a driving means for rotating the first arm on the first rotation shaft and rotating the second arm, by an angle which is twice as great as the angle of rotation of the first arm, on the second rotation shaft in the opposite direction to the direction of rotation of the first arm, along with the rotation of the first rotation shaft, said second arm being substantially formed as a torch.

In the above-mentioned torch-angle setting device (hereinafter referred to as "angle setting device"), the first rotation shaft is arranged perpendicular to the turning shaft, an end of the first rotation shaft is connected to the turning shaft, the second rotation shaft is arranged parallel with the first rotation shaft, and these rotation shafts are connected through the first arm. Further, since along with the rotation of the first rotation shaft the second arm is rotated by an angle which is twice as great as the angle of rotation of the first arm, on the second rotation shaft in a direction opposite to the direction of rotation of the first arm, the angle made between the first arm and an extension line of the turning shaft equals the angle between the second arm and an extension line of the turning shaft, as seen from the direction of an extension line of each of the rotation shafts. The intersection of the extension line of the turning shaft and the extension line of the second arm is positioned on the turning shaft.

Accordingly, in the case where the second arm is substantially formed as a torch, the torch can be set at the same angle as that of the first angle, by setting the first angle to the extension line of the turning shaft at a desired angle.

In the angle setting device, it is preferable that the driving means is comprised of a first fixed member which is fixed to the first rotation shaft and has a preset diameter, a second fixed member which is fixed to the second arm which is arranged on the extension line of the second rotation shaft and has approximately a diameter of ½ of the diameter of the first fixed member, and a transmitting member connected with the first fixed member and with the second fixed member, and a rotating member which rotates the first rotation shaft or the second arm.

In the above-mentioned angle setting device, when the first arm (or the second arm) is rotated by means of the rotating member, this rotation is transmitted to the second fixed member through the first fixed member and the transmitting member. In this time, since the ratio of the diameter of the first fixed member to that of the second fixed member is set at 2:1, the second arm is rotated by angle which is twice as great as that of the first arm.

As the above-mentioned individual fixed member, toothed pulleys or sprocket wheels can be used. As the transmitting member, a middle gear, a toothed belt or a chain are preferably used. By selecting the fixed member and the transmitting member from among the above-mentioned parts, a secure drive without slippage can be realized.

However, if slippage is not substantially generated by the coefficient of friction between the fixed members and the transmitting member, the combination of a V pulley and a V belt, or the combination of pulleys and flat belt may be used.

In any of the above-mentioned angle setting devices, the device is preferably formed in such a manner that when the first arm is rotated on the first rotation shaft and the second arm is rotated on the second rotation axis, the extension line of the second arm intersects the extension line of the turning shaft. By forming the angle setting device in such a manner, the zero offset system can be realized with a simple structure.

In any of the above-mentioned angle setting devices, it is preferable that the second arm has a laser torch in which a laser beam can pass, and the turning shaft, the first rotation shaft, the second rotation shaft, and the first arm are formed of tubes, respectively, and a light path is formed within the turning shaft, the first rotation shaft, the second rotation shaft, and the first arm. By forming the angle setting device in such a manner, a laser cutting torch can be formed by using in common the respective shafts and laser path within them.

BRIEF DESCRIPTION OF THE DRAWINGS

Preferred embodiments of the above-mentioned angle setting device are explained in the following drawings, in which.

DETAILED DESCRIPTION

Figure 5A:
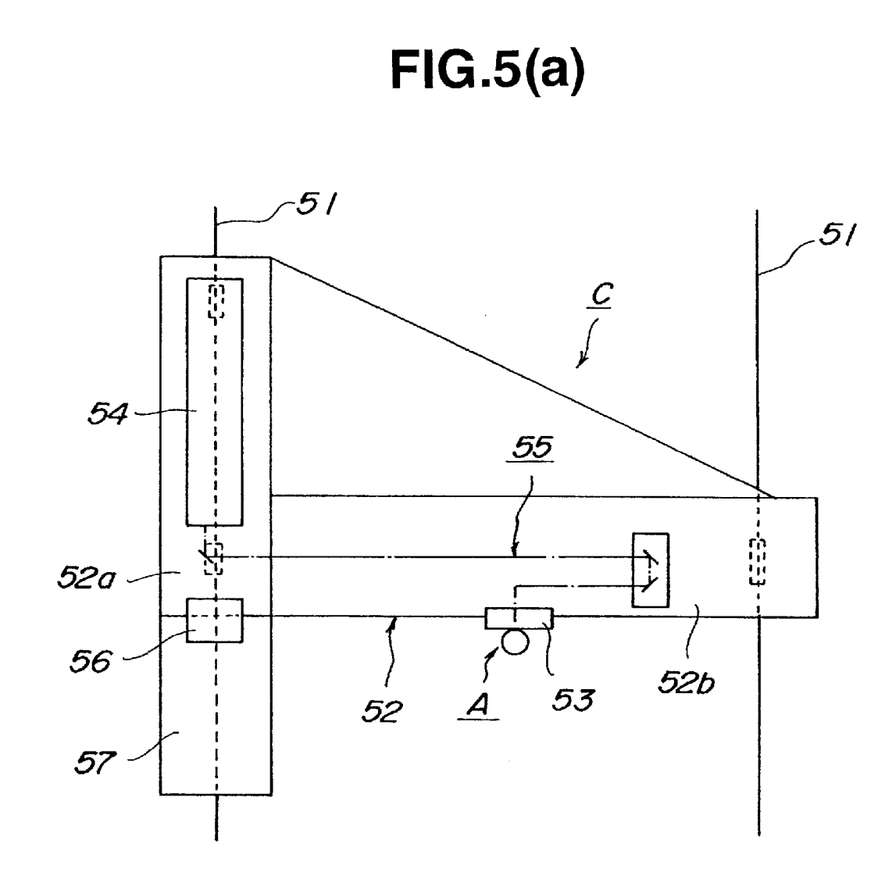
FIG. 5 is a view illustrating an example of the whole structure of a numerically-controlled laser cutting machine.
Figure 5B:
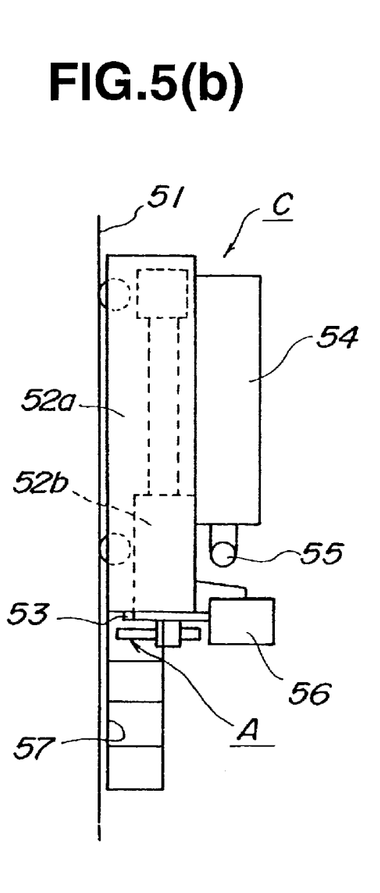

Each of angle setting devices A, B according the first and second embodiment is formed as a torch for laser-cutting, wherein each of the devices A and B is formed in such a manner that it is preferably mounted on a numerically-controlled laser cutting machine C so as to be advantageously used, as shown in FIG. 5. However, the principle of the present invention can be applied not only for the laser cutting machine, but also for a numerically-controlled laser cutting machine having a torch such as a gas cutting torch and plasma cutting torch mounted thereon, without altering the structure of the angle setting device.

First, referring to FIG. 5, a typical example of the numerically-controlled(NC) laser cutting machine C is briefly explained. In FIG. 5, a truck 52 is illustrated which is put on a pair of rails 51 laid parallel to each other so as to be movable. This truck 52 is comprised of a saddle 52a arranged along a rail 51 and girder 52b arranged meeting at a right angle to a direction of the rail 51.

A lateral movement carriage 53 is put on the girder 52b so that the lateral movement carriage 53 is movable in a direction at a right angle to the direction of rail 51. The angle setting device A is put on the lateral movement carriage 53. Further, a laser oscillator 54 is put on the saddle 52, so that a light path 55 is formed between the laser oscillator 54 and the angle setting device A. This light path 55 is comprised of a tube which passes a laser beam and a plurality of mirrors, so that a given length of the light path 55 can be maintained, notwithstanding a change in the distance between the laser oscillator 54 and the angle setting device A.

A numerically-controlled(NC) device is provided at a given place within the saddle 52a. A control board 56 provided with an input unit such as a key board and with a display unit such as a Braun tube is provided on the outer surface of the saddle 52a. A step 57 corresponding to the control board 56 is formed integrally with the saddle 52a.

In the above-mentioned NC laser cutting machine, data concerning a cutting form of material being cut, a portion where groove angle cutting is carried out in the cutting form, groove angle, the thickness of material being cut, and cutting speed are input to the NC device of control board 56. The torch of the angle setting device A is moved to a cutting beginning position on material being cut. Thereafter, a given operation is carried out according to the preset cutting program, so that material being cut can be cut into an objective cutting form, and groove angle cutting can be made in a given portion.

Figure 4A:
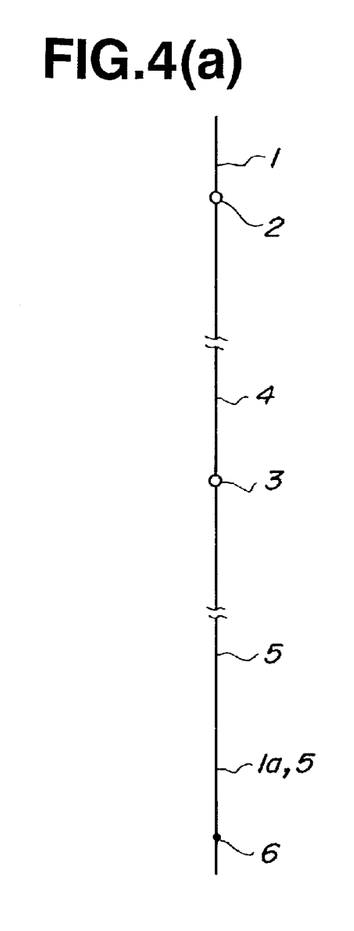
FIG. 4 is a view illustrating the principle in the setting of a torch-angle.
Figure 4B:
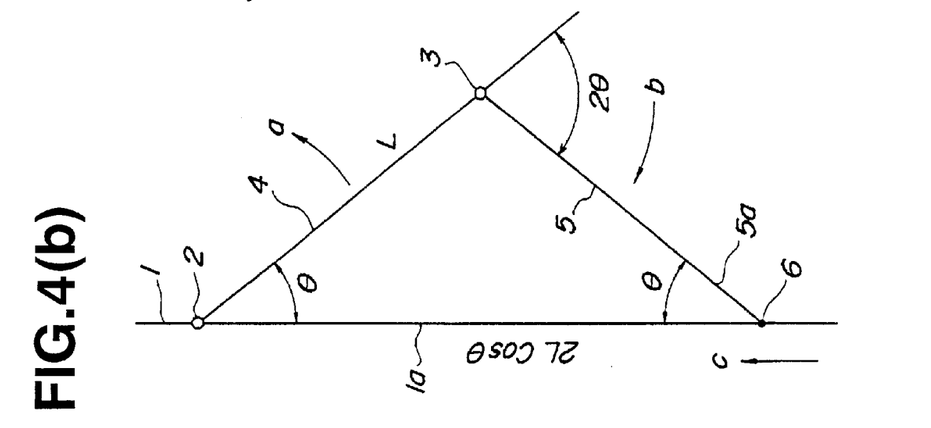
Figure 4C:
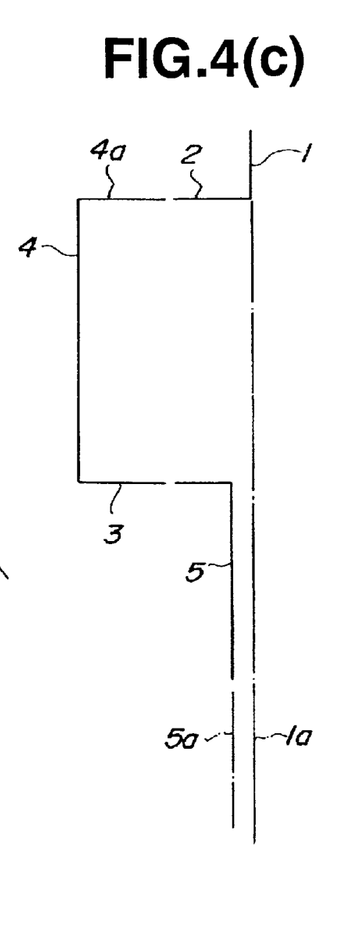

Referring to FIG. 4, the principle of the setting of torch-angle is explained. In the drawing, numeral "1" designates a turning shaft, which is arranged perpendicular to the surface of material being cut. Numeral "2" designates a first rotation shaft, which is arranged at a right angle to the first rotation shaft 1, and which has an end connected with the turning shaft 1. Numeral "3" designates a second rotation shaft, which is arranged parallel with the first rotation shaft 2. Numeral "4" designates a first arm, which connects the first rotation shaft 2 with the second rotation shaft 3, and which is rotatable on the first rotation shaft. Numeral "5" designates a second arm, which is rotatable on the second rotation shaft 3, and which is formed substantially as a torch.

In particular, the second arm 5 may be formed as a torch in such a manner as in the undermentioned first and second embodiments. Further, the second arm 5 may be formed as an arm provided with a torch holder for attaching gas cutting torch and plasma cutting torch. Further, a zero-offset system can be formed by aligning the axial center of the second arm 5 of the extension thereof 5a (hereinafter referred to as "the extension of line") with an axial center of the turning shaft 1 or the extension thereof (hereinafter referred to as "the extension of line") by adjusting lengths of the first rotation shaft 2 and the second rotation shaft 3, or offset system can be formed without coinciding the two with each other.

First, in the case where a cut is made perpendicular to the material being cut, as shown in FIG. 4(a), the first arm 4 and second arm 5 are arranged perpendicular to the surface of material being cut, respectively. This state is a basic arrangement.

In the case where the groove angle cutting is made at the set groove angle θ, as shown in FIG. 4(b), the first arm 4 is turned by angle θ in the direction of arrow a on the first rotation shaft 2, while the second arm 5 is turned, by angle 2 which is two times as great as the turning angle θ of the first arm 4, in the direction of arrow b, which is the opposite direction to the turning direction of the first arm 4, on the second rotation shaft 3.

Accordingly, an angle made by the first arm 4 and the second arm 5 becomes 180°−2θ, so that an angle made by the extension of line 5a of the first arm 5 and the extension of line 1a of the turning shaft 1 becomes θ, wherein the second arm (torch) can be set at the objective groove angle θ. In this case, the intersection (in case of an offset system, observed intersection) 6 of the extension of line 5a of the second arm 5 and the extension of line 1a of the turning shaft 1 moves in the direction of arrow c (upward) along the extension of line 1a of the turning shaft 1.

In such a manner, a triangle formed by the extension of line 1a of the turning shaft 1, the first arm 4, the second arm 5 and the extension of line 5a of the second arm 5 becomes an equilateral triangle. Accordingly, even if any angle of the first arm 4 is set, an angle of the second arm 5 to the extension of line 1a of the turning shaft 1 can be made at an angle which is the same as that of the first arm 4. In this way the torch-angle can be set.

Further, when the intersection 6 moves in the direction of arrow c along the extension of line 1a of the turning shaft 1 in case of setting the angle of the second arm 5, a distance from the turning center of the first arm 5 (the intersection of the] first rotation shaft 2 and the first arm 4) to the intersection 6 can be calculated as 2L cosθ under the condition where a length of the first arm 4 is L and an angle of the first arm to the extension 1a of the turning shaft 1 is θ.

As a mechanism for turning the first arm 4 in the direction of arrow a and at the same time turning the second arm 5 in the direction of arrow b, for example, independent motors are provided for the respective rotation shafts 2 and 3, or the respective arms 4 and 5, so that the respective arms 4 and 5 can be independently turned by means of motors. Further, the mechanism can be formed as in each of the embodiments.

Figure 1:
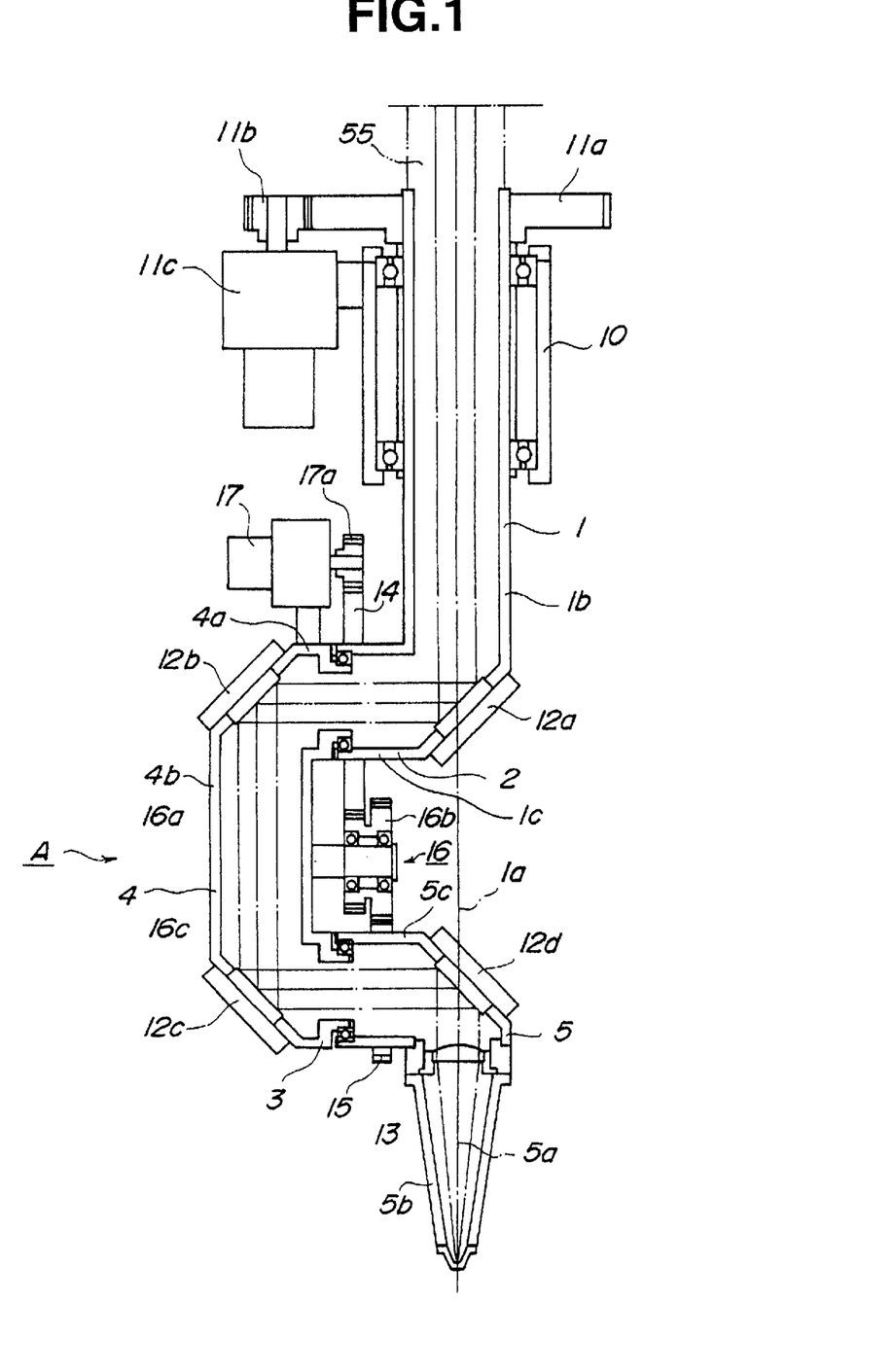
FIG. 1 is a sectional view illustrating the structure of the angle setting device according to a first embodiment.
Figure 2:
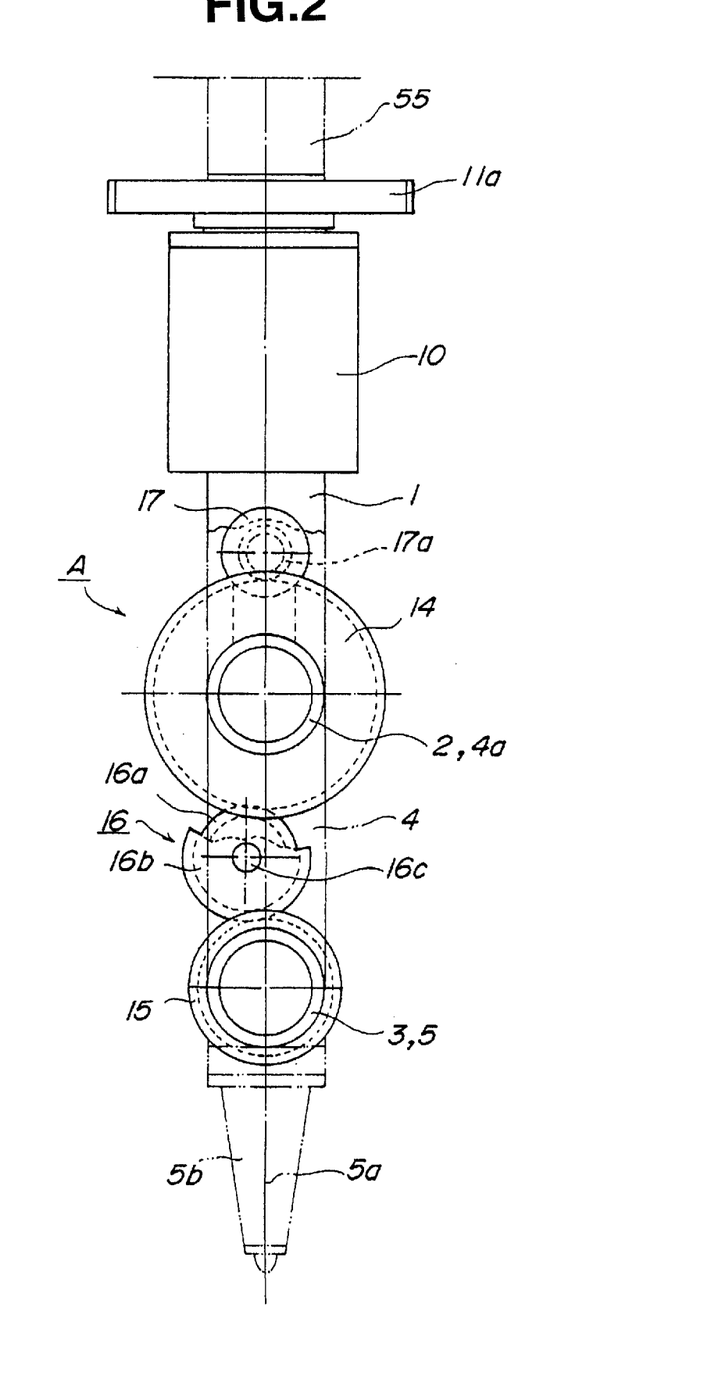
FIG. 2 is a front view illustrating the structure of the angle setting device according to the first embodiment.
Figure 3:
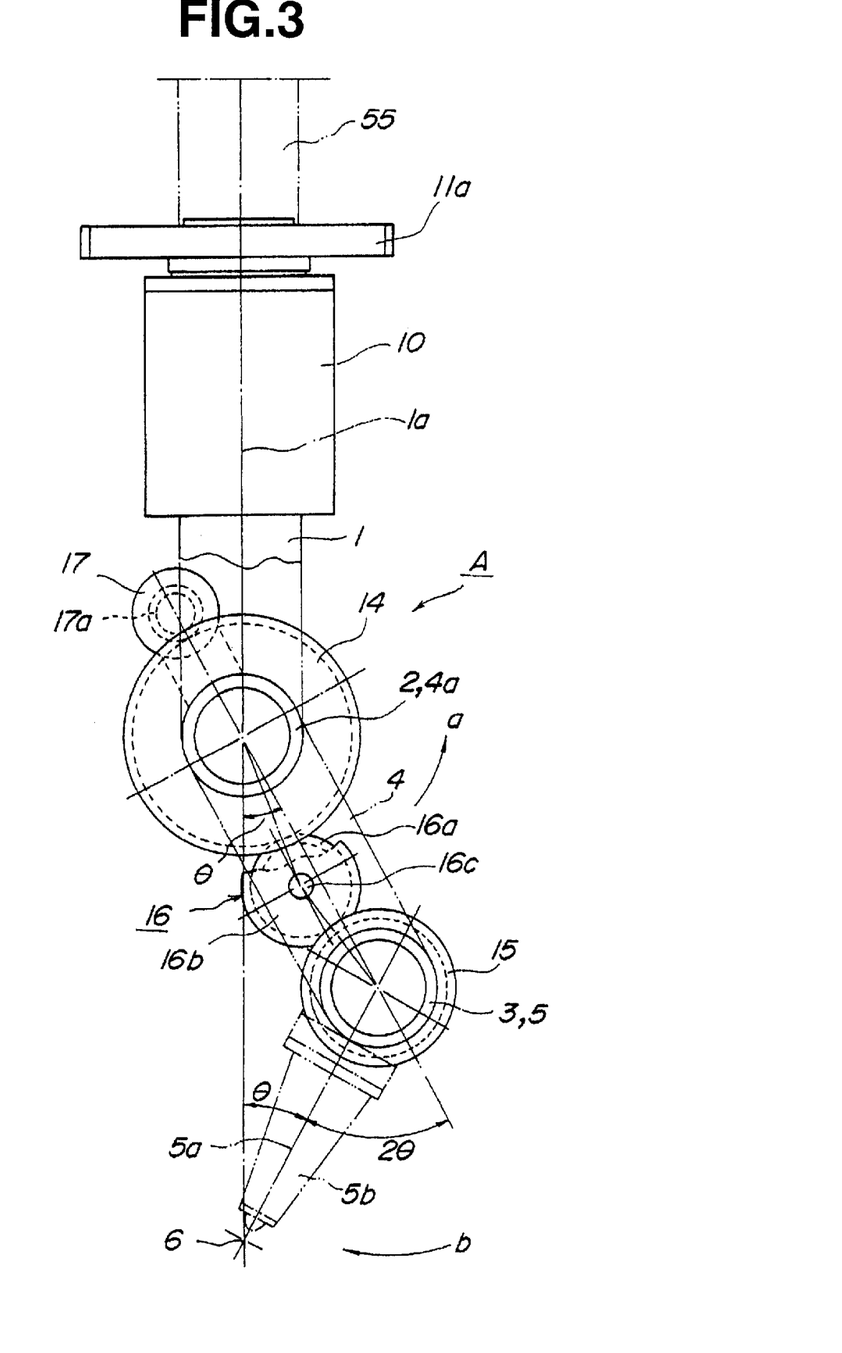
FIG. 3 is a view illustrating the operation of the angle setting device of when a torch-angle is set by means of the angle setting device according to the first embodiment.

Then, referring to FIGS. 1 to 3, the structure of the angle setting device A according to the first embodiment is explained. In the drawing, the same marks as in FIG. 4 are affixed to the respective rotation shaft and the respective arms. The numeral "1" designates a turning shaft arranged perpendicular to the surface of material being cut (not shown), numeral "2" designates a first rotation shaft which is arranged at right angles to the turning shaft 1, and which has an end connected with the turning shaft. Numeral "3" designates a second rotation shaft which is arranged parallel with the first rotation shaft, numeral "4" designates a first arm which is provided on the first rotation shaft 2 so as to be rotatable on the first rotation shaft 2 and which has an end formed as the second rotation shaft 3. Numeral "5" designates a second arm which is provided on the second rotation shaft 3 so as to be rotatable on the second rotation shaft 3 and is substantially a torch.

The turning shaft 1 is formed as a tube comprised of a vertical main body 1b and an orthogonally bent portion formed at the lower end of the main body 1b. A tubular body forming a light path 55 of laser beam within it is connected with the upper side of the main body 1b.

Further, the turning shaft 1 is rotatably supported on a bearing unit 10, wherein a rotary gear 11a is held to the turning shaft 11a at a given position thereof. A frame forming the bearing unit 10 or a NC laser cutting machine C is mounted with a motor 11c with a gear 11b which is engaged with the rotary gear 11a. Therefore, the second arm 5 (torch) can be turned on the turning shaft 1 by motor 11c according to the state of a curved line of a cutting form with the advance of cutting of material being cut.

The bent portion 1c formed at the lower end of the main body 1b forming the turning shaft 1 is formed as a first rotation shaft 2. Therefore, the first rotation shaft 2 is set at right angles to the turning axis 1, while an end of the first rotation shaft 2 is connected with the turning shaft 1.

The first arm 4 is formed as a tube which has a shape of "J" and which is comprised of an upper bent portion 4a, a main body 4b, and a second rotation shaft 3 connected with the lower end of the main body 4b. The upper bent portion 4a is engaged with the first rotation shaft 2 to be rotatable on the first rotation shaft 2, by which the first arm 4 is formed so as to be rotatable on the first rotation shaft 2. A length of the first arm 4 (a length of the main body 4b) is not restricted. However, it is preferable to be as short as possible for miniaturizing the angle setting device A.

The second arm 5 is formed as a tube comprised of a main body 5b, and a bent portion 5c formed at the upper end of the main body 5b at a right angle to the main body 5b, wherein the bent portion 5c is engaged with the second rotation shaft 3 so as to be rotatable on the second rotation shaft 3, and the main body 5b is formed as a torch (hereinafter referred to as ("torch 5b").

As above-mentioned, the whole shape of the combination of the turning axis 1, the first arm 4, and the second arm 5 is a shape of crank. The respective corner portions are provided with mirrors 12 to 12d, and, further, the second arm 5 is provided with lens 13. Therefore, a laser beam sent through a light path 55 is reflected by the respective mirrors 12a to 12d, condensed through lens 13, and applied to material being cut from the torch 5b.

A first fixed gear 14 as a first fixed member is fixed to the periphery of the first rotation shaft 2, while a second fixed gear 15 as a second fixed member is fixed to the periphery of the second arm 5. These first and second gears are formed so as to have substantially the relation between the two that the ratio of diameters of the first and second fixed gears is 2:1. Further, a middle gear 16 as a transmitting member, is arranged between the two fixed gears wherein a small gear 16a of the middle gear is engaged with the first fixed gear 14, while a large gear 16b of the middle gear is engaged with the second fixed gear 15, so that the first fixed gear 14 and the second fixed gear 15 can be rotated and a rotation axis 16c is provided with the first arm 4. Further, a motor 17 as a rotating member is provided around the periphery of the upper bent portion 4a of the first arm 4, and a gear 17 attached to the motor 17 is engaged with the first fixed gear 14, so that the gear 17a can be rotated along the periphery of the first fixed gear 14.

In the above-mentioned angle setting device A, a procedure of from a state where the extension of line 1a of the turning shaft 1 and the extension of line 5a of the second arm 5 are arranged in a straight line (a state where the torch 5b is arranged vertically) as shown in FIG. 2 to setting the torch 5b at angle as shown in FIG. 3 is explained.

When the gear 17 is driven by the motor 17, the gear 17 is rotated along the periphery of the first fixed gear 14 in the direction of arrow a, because the first fixed gear 14 is fixed to the first rotation shaft 2, while along with this rotation of the gear 17a, the first arm 4 is rotated on the first rotation shaft 2 in the direction of arrow a. Therefor, the rotation axis 16c is moved in the direction of arrow a, while along with the movement of the rotation shaft 16c, the small gear 16a moves around the first fixed gear 14 with rotating on its own axis. Accordingly, the large gear 16b makes the same rotation as that of the small gear 16a, and this rotation is transmitted to the second fixed gear 16.

In this time, the rotation of the first fixed gear 14 is transmitted through the middle gear 16 to the second fixed gear 15. Since the second arm 5 is rotated in the opposite direction to the rotation direction of the first arm 4, on the second rotation shaft 3, and the second fixed diameter 15 has the diameter of ½ times of that of the first fixed gear 14, the rotation angle of the second arm 5 becomes 2. Accordingly, an angle made by the extension of line 1a of the turning shaft 1 and the extension of line 5a of the second arm 5 becomes, which is equal to the angle of the first arm 4 to the turning shaft 1.

As above-mentioned, it is possible to rotate the first arm 4 and the second arm 5 at the same angle by rotating the motor 17. Accordingly, it becomes possible to make the objective groove angle cutting by previously setting the amount of rotation of motor 17 (the rotation angle 14 of the motor 17 to the first fixed gear 14) it is possible to make the objective groove angle cutting by setting the second arm 5 (torch 5b) at a desired angle.

Figure 6:
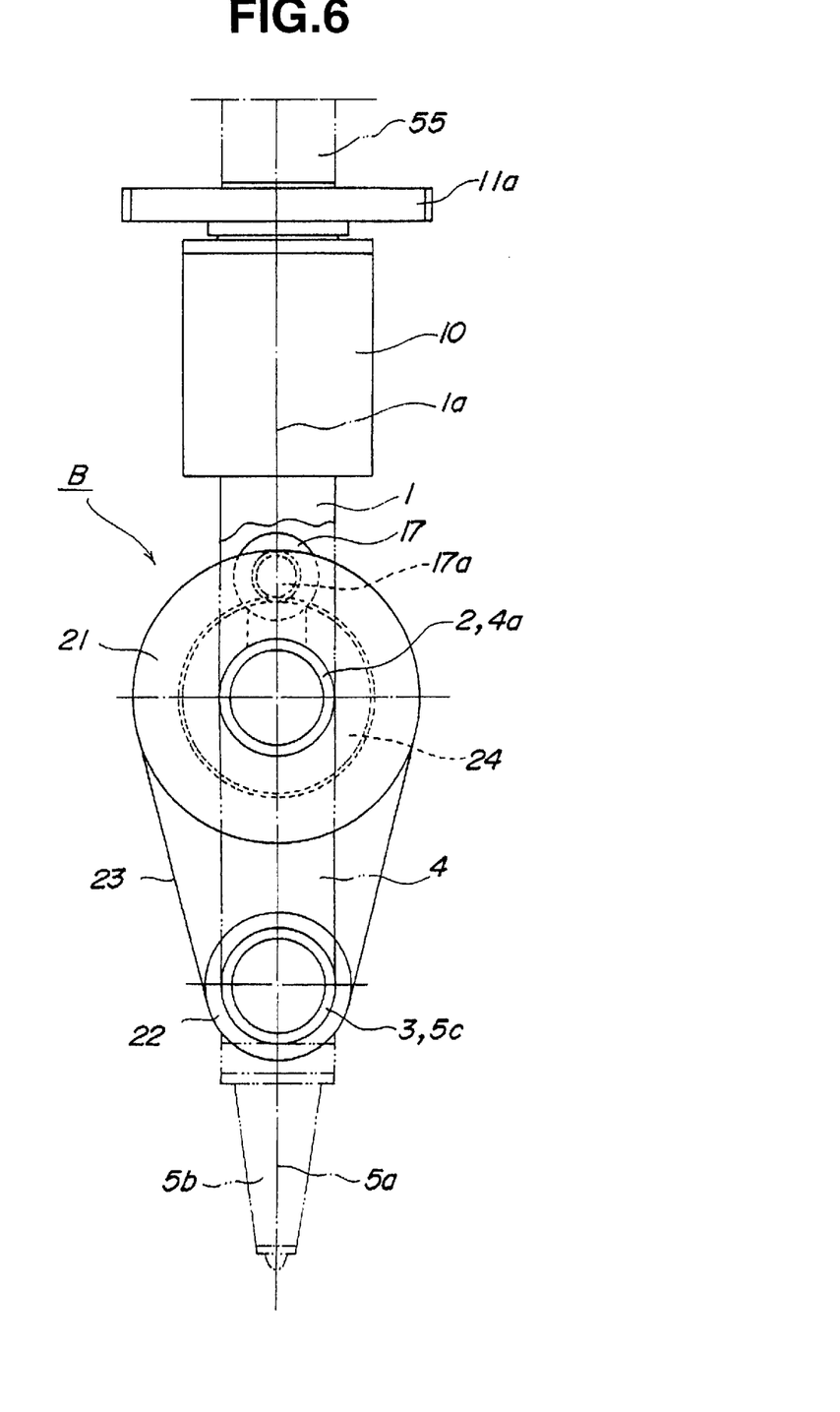
FIG. 6 is a view illustrating the structure of the angle setting device according to a second embodiment.
Figure 7:
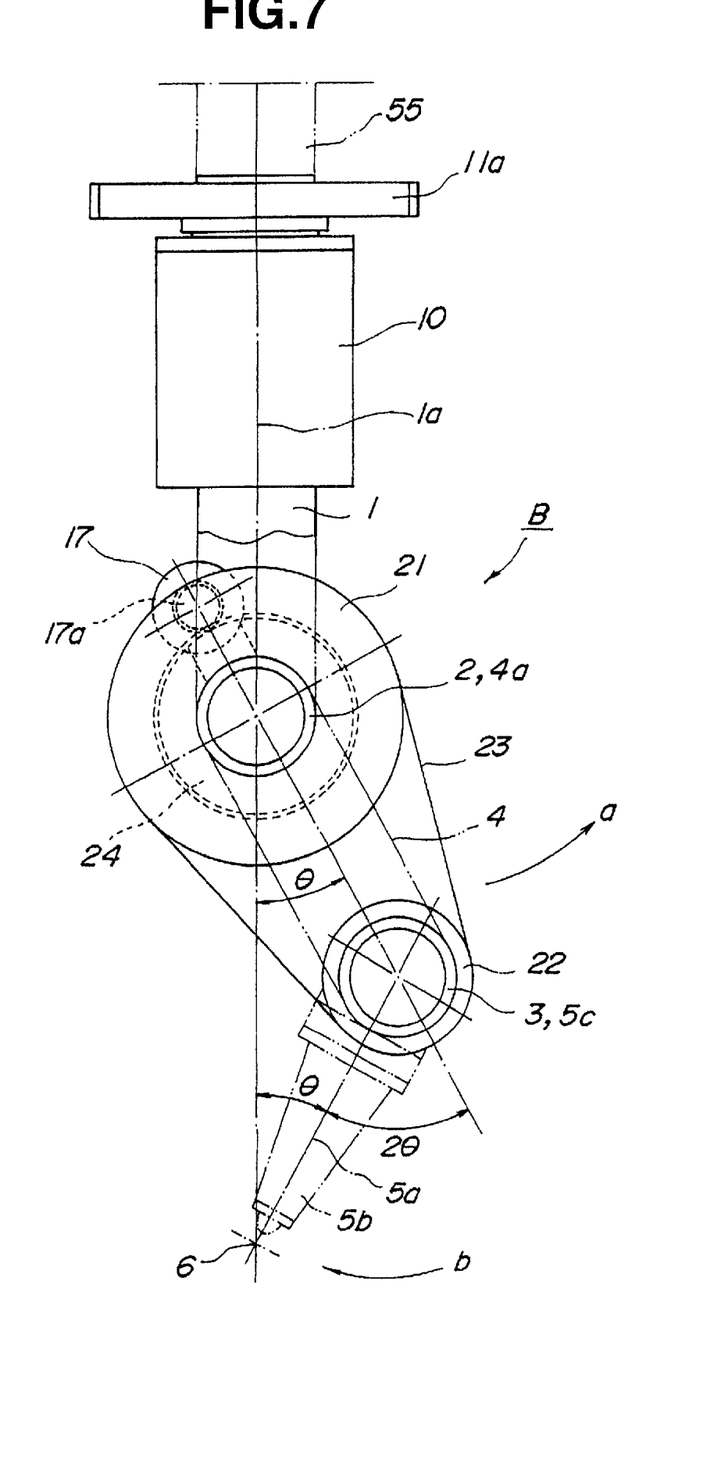
FIG. 7 is a view illustrating the operation of the angle setting device when a torch-angle is set by means of the angle setting device according to the second embodiment.

Then, referring to FIGS. 6 and 7, the structure of the angle setting device B according to the second embodiment is explained. In the drawings, the same marks are affixed to the same portions as that in the first embodiment and portions having the same functions as that in the first embodiment, and the explanation about these portions is omitted.

In the drawings, a first pulley 21 as a first fixed member is fixed to a first rotation shaft 2, while a second pulley 22 as a second member is fixed to the periphery of the second arm 5. The first pulley 21 and the second pulley 22 are formed so as to have substantially the relation between the two that the ratio of diameters of the first and second fixed gears is 2:1, wherein the two are connected with each other through a belt 23 as a transmitting member. Further, a gear 24 forming a rotation member is fixed to the first rotation shaft 2, while a motor 17 as a rotation member is provided around the periphery of the upper bent portion 4a. A gear 17a attached to the motor 17 is engaged with the gear 24 so that the gear 17a can be rotated along the periphery of the gear 24.

It is necessary that slippage is not generated between each of the pulleys 21, 22 and the belt 23 when the belt 23 is connected. As combinations of each of pulleys 21, 22 and a belt 23, the use of toothed pulleys and a toothed belt, or the combination thereof is preferably used. However, if enough tension is applied to the belt 23 and enough friction between the two is obtained, the combination of V pulleys and a V belt, or the combination of flat pulleys and flat belt may be used.

In the above-mentioned angle setting device B, under the condition where the extension of line 1a of a turning shaft 1 and the extension of line 5a of the second arm 5 are arranged in a straight line as shown in FIG. 5, if the motor 17 is rotated as shown in FIG. 7, the gear 17a is rotated along the periphery of the gear 24, while along with the rotation of the gear 24, the first arm 4 is rotated in the direction of arrow a as shown in FIG. 7, and at the same times along with the rotation of the first arm 4, the second arm 5 on which the belt 23 is connected is rotated in the direction of arrow b. When the first arm 4 is rotated by angle in the direction of arrow a, the second arm 5 is rotated by angle in the direction of arrow b.

As a result, the second arm 5 can be set to angle which makes it possible to carry out the groove angle cutting.

In each of the above-mentioned embodiments, a main body 5b of a second arm 5 is formed as a laser cutting torch. However, in another structure in which the main body of the second arm 5 is provided with a torch holder, in which gas cutting torch 5b or a plasma cutting torch is held, the setting of torch-angle is also possible without altering the structure. In this case, it is possible to form the zero-offset of the axial center of a torch with the extension of line 1a of the turning shaft 1, by aligning the axial center of a torch with the extension of line 1a of the turning shaft 1, by adjusting appropriately a length of a bent portion 5c of the second arm 5, or to form the offset of the axial center of a torch with the extension of line 1a of the turning shaft 1, by arranging the two.

As explained in detail, in the angle setting device, since a first rotation shaft 2 is arranged at right angles to a turning shaft 1, and while a second rotation shaft 3 is arranged parallel with the first rotation shaft 1, the first rotation shaft 2 and second rotation shaft 3 are connected through a first arm 4, and along with rotating the first rotation shaft 2 by means of a driving means, and the second arm 5 is rotated, by an angle which is twice as great as an angle of rotation of the first arm 4 against the first arm 4, in the opposite direction to the direction of rotation of the first arm 4, an angle made between the first arm 4 and the extension of line 1a of a turning shaft 1 is equal to an angle made between the second arm 5 and the extension of line 1a of a turning shaft 1, as viewed from the direction of the extension line of the respective rotation shafts. Therefore, when the second arm 5 is used substantially as a torch, the torch can be set at the same angle as that of the first arm 4 to the extension of line la of a turning shaft 1.

Further, when a first arm 4 or a second arm 5 is rotated by means of rotating means, this rotation is transmitted through a first fixed member 4 (a first fixed gear 14 or a first pulley 21) and a transmitting member (belt 23) to a second fixed member (a second fixed gear 15 or a second pulley 22), by which the second arm is rotated so that the second arm can be rotated against the first arm 4 by an angle which is twice as great as an angle of rotation of the first arm 4 against the first arm 4.

Further, since the angle setting device includes a second arm 5 as a laser torch, and a turning shaft 1, a first rotation shaft 2, a second rotation shaft 3 and a first arm 4 are formed with tubes, respectively, in which a light path for passing a laser beam is formed, each shaft of the turning shaft 1, the first rotation shaft 2, the second rotation shaft 3 and the first arm 4 and the light path formed within the individual shaft are used in common so that a laser cutting torch can with a brief structure be formed.

What is claimed is:

1. A torch-angle setting device characterized in that the torch-angle setting device comprises a turning shaft which is arranged perpendicularly to material being cut, a first rotation shaft which is arranged at right angle to the turning shaft and which has an end connected with the turning shaft, a second rotation shaft which is arranged in parallel with the first rotation shaft, a first arm which is connected with the first rotation shaft and with the second rotation shaft, a second arm which has an end connected with the second rotation shaft, a driving means for rotating the first arm on the first rotation shaft and rotating the second arm, by an angle which is twice as much as the angle of rotation of the first arm, on the second rotation shaft in the opposite direction to the direction of rotation of the first arm, along with the rotation of the first rotation shaft, and said second arm is substantially formed as a torch.

2. A torch-angle setting device as claimed in claim 1 wherein the driving means is comprised of a first fixed member which is fixed to the first rotation shaft and has a preset diameter, a second fixed member which is fixed to the second arm which is arranged on the extension of line of the second rotation shaft and has substantially a diameter of ½ of the diameter of the first fixed member, and a transmitting member connected with the first fixed member and with the second fixed member, and a rotating member which rotates the first rotation shaft or the second arm.

3. A torch-angle setting device as claimed in any of claim 1, wherein when first arm is rotated on the first rotation shaft and the second arm is rotated on the second rotation shaft, the extension of line of the second arm intersects the extension of line of the turning shaft.

4. A torch-angle setting device as claimed in claim 1, wherein the second arm has a laser torch in which a laser beam can pass, and the turning shaft, the first rotation shaft, the second rotation shaft, and the first arm are formed of tubes, respectively, and a light path is formed within the turning shaft, the first rotation shaft, the second rotation shaft, and the first arm.

5. A torch-angle setting device as claimed in claim 2, wherein when first arm is rotated on the first rotation shaft and the second arm is rotated on the second rotation shaft, the extension of line of the second arm intersects the extension of line of the turning shaft.

6. A torch-angle setting device as claimed in claim 2, wherein the second arm has a laser torch in which a laser beam can pass, and the turning shaft, the first rotation shaft, the second rotation shaft, and the first arm are formed of tubes, respectively, and a light path is formed within the turning shaft, the first rotation shaft, the second rotation shaft, and the first arm.

7. A torch-angle setting device as claimed in claim 3, wherein the second arm has a laser torch in which a laser beam can pass, and the turning shaft, the first rotation shaft, the second rotation shaft, and the first arm are formed of tubes, respectively, and a light path is formed within the turning shaft, the first rotation shaft, the second rotation shaft, and the first arm.

* * * * *